United States Patent
Kapadi et al.

(10) Patent No.: US 7,711,531 B2
(45) Date of Patent: May 4, 2010

(54) SYSTEM AND METHOD FOR SUGARCANE RECOVERY ESTIMATION

(75) Inventors: Mangesh D. Kapadi, Bangalore (IN); Jinendra K. Gugaliya, Bangalore (IN); Lingathurai Palanisamy, Bangalore (IN); Jayaram Balasubrahmanyan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 626 days.

(21) Appl. No.: 11/445,053

(22) Filed: May 31, 2006

(65) Prior Publication Data

US 2007/0282583 A1 Dec. 6, 2007

(51) Int. Cl.
| | | |
|---|---|---|
| G06F 19/00 | (2006.01) | |
| G06F 7/60 | (2006.01) | |
| G06F 7/00 | (2006.01) | |
| G06G 7/48 | (2006.01) | |
| G06Q 10/00 | (2006.01) | |
| G06Q 30/00 | (2006.01) | |
| G05B 19/418 | (2006.01) | |

(52) U.S. Cl. .............. 703/6; 702/1; 702/2; 702/22; 703/2; 703/11; 705/1; 705/8; 705/26; 707/100

(58) Field of Classification Search .......... 703/6, 703/2, 11; 702/1, 2, 22; 705/1, 8, 26; 707/100
See application file for complete search history.

(56) References Cited

U.S. PATENT DOCUMENTS 6,662,185 B1 * 12/2003 Stark et al. ............. 707/100
2002/0103688 A1 * 8/2002 Schneider ................. 705/8
2004/0194442 A1 * 10/2004 Maertens ............... 56/10.2 R
2005/0234691 A1 * 10/2005 Singh et al. ............... 703/11
2006/0015253 A1 * 1/2006 Ochs et al. ................ 702/1
2006/0025927 A1 * 2/2006 Hoskinson et al. ......... 702/1

OTHER PUBLICATIONS

Salassi et al. "Modeling Within-Season Sugarcane Growth for Optimal Harvest System Selection" Agricultural Systems 73 (2002) 261-278.*
Scarpari et al. "Sugarcane Maturity Estimation through Edaphic-Climate Parameters". Sci. Agric. v.61 n.5, p. 486-491.*
Grantz et al. "Stomatal Responses to Light and Humidity in Sugarcane: Prediction of Daily Time Courses and Identification of Potential Selection Criteria": Plant, Cell and Environment 1990.*

(Continued)

Primary Examiner—Kamini S Shah
Assistant Examiner—Shambhavi Patel
(74) Attorney, Agent, or Firm—Schiff Hardin LLP

(57) ABSTRACT

A product recovery prediction model that models recovery of a product from a crop is generated by inputting training product recovery data by date, age, and variety. A first model that models season dependent effects on product recovery, and/or a second model that models age dependent effects on product recovery, and/or a third model that models other effects such as, for example, weather dependent effects on product recovery are generated. The first, second, and/or third models are combined, and the product recovery prediction model is generated based on the combined first, second, and/or third models and on the training product recovery data. The crop may be sugarcane, and the product may be sugar. The product recovery prediction model may be used to predict recovery of the product to use for harvesting or any economical decisions.

41 Claims, 5 Drawing Sheets

OTHER PUBLICATIONS

Robertson et al. "Accumulation of Reducing Sugars by Sugarcane: Effects of Crop Age, Nitrogen Supply and Cultivar", Fields Crop Research, 1996.*

Jiao et al. "An Integrated Statistical and Optimisation Approach to Increasing Sugar Production within a Mill Region", Computers and Electronics in Agriculture, 2005.*

Salassi, et al. "Incorporation of Within-Season Yield Growth into a Mathematical Programming Sugarcane Harvest Scheduling Model", Journal of Agricultural and Applied Economics, 32, 3, Dec. 2000.*

Whan et al., "Scheduling Sugar Cane Plant and Ratoon Crops and a Fallow—A Constrained Markov Model," Journal of Agriculture Engineering Research, vol. 21, pp. 281-289, 1976.

Jiao et al. "An Integrated Statistical and Optimisation Approach to Increasing Sugar Production Within a Mill Region," Computers and Electronics in Agriculture, vol. 48, pp. 170-181, 2005.

Muchow et al., "Optimising harvest date in sugar production: a case study for the Mossman mill region in Australia II. Sensitivity to crop age and crop class distribution," Field Crops Research 57, pp. 253-251, 1998.

Robert A. Gilbert et al., "Sucrose Accumulation and Harvest Schedule Recommendations for CP Sugarcane Cultivars", 2004 Plant Management Network, Published Apr. 2, 2004, 7 pgs.

* cited by examiner

SYSTEM AND METHOD FOR SUGARCANE RECOVERY ESTIMATION

TECHNICAL FIELD OF THE INVENTION

The present invention relates to estimating recovery of a product, such as sugar, from a crop, such as sugarcane.

BACKGROUND OF THE INVENTION

Sugarcane is a member of the grass family and is valued chiefly for the juices (specially sucrose) that can be extracted from its stems. The raw sugar that is produced from these juices is later refined into white granular sugar.

Sugarcane, which is the raw material for the production of sugar, is a perennial crop. One planting of sugarcane generally results in three to six annual harvests before replanting is necessary. The very first harvest after the planting is called "Plant Cane," while the subsequent harvests before the next replanting are called "Stubble" or "Ratoon." The first stubble or ratoon is the first harvest following the plant cane harvest, the second stubble or ratoon is the second harvest following the plant cane harvest, and so on.

As a sugarcane plant matures throughout the growing season, the amount of total sucrose in the cane increases. Most of this sucrose production occurs when the plant has fully matured and begins to ripen. However, the percentage of sucrose content (or quality of cane juice) mainly depends on various factors such as the sugarcane variety (also referred to as cultivar), the maturity of the sugarcane (the age of the sugarcane from the date of planting in the case of plant cane or from the date of the last harvest in the case of ratoon), weather conditions, diseases, harvesting conditions, delays between cutting and crushing, and the amount of trash in the sugarcane during crushing. Trash can be defined as the amount or quantity of leaves, tops, dead stalks, roots, soil, etc., delivered to the crusher along with the sugarcane. Hence, the accumulation of total sucrose within the sugarcane is a function of its sucrose percentage and vegetative growth. Recovery is a measure of this sucrose percentage.

A typical sugar processor buys sugarcane from various farmers, and these farmers usually have contracts with the sugar processors. Each sugar processor knows the planting date of each crop of the different farmers and the varieties of the sugarcane. The long-term viability of the sugar industry depends upon finding ways to produce sugar more economically through production management decisions that reduce production costs or increase return. Harvest scheduling, which includes decisions about when to harvest which variety (or cultivar) at what age of the sugarcane, is one practice that has a direct impact on the net farm return. The net farm return may be defined as the total sugar (usually by weight) obtained from a given planting.

In one embodiment of the present invention, a methodology is developed for the estimation of sugar recovery (e.g., percentage of sucrose in the sugarcane). This estimation can be used to assist in daily harvest scheduling at the individual farm level. One objective of this methodology is to capture the dynamic effects of sucrose accumulation (which depends on variety, age, weather condition, etc.) during growing and harvesting seasons and to utilize this information, such as in a mathematical program modeling framework, to determine when specific sugarcane fields should be harvested so as to maximize total farm net returns.

As individual sugarcane varieties (or cultivars) have distinct sucrose maturation curves, which may vary up or down from year to year depending upon weather conditions and other factors, the estimated sugar content of individual fields can be incorporated into harvest scheduling that includes an optimal order for harvest of all fields so as to maximize the total sugar produced (or the total net return received).

Several studies have attempted to develop models for estimating the percentage of sucrose in sugarcane. Whan, et al., in "Scheduling Sugar Cane Plant and Ratoon Crops and a Fallow—a Constrained Markov Model," Journal of Agriculture Engineering Research, vol. 21, pages 281-289, 1976, suggested that the accumulation of sugar (percentage-wise) might be approximated as a quadratic function of time or age of the sugarcane.

Jiao, et al., in "An Integrated Statistical and Optimization Approach to Increasing Sugar Production Within a Mill Region," Computers and Electronics in Agriculture, vol. 48, page 170-181, 2005 researched Australian sugarcane varieties (cultivars) and suggested that individual varieties (cultivars) have distinct sucrose maturation curves with different peak levels. This study concluded that the sugar content of a variety (cultivar) could be predicted as a function of time (i.e., age of the sugarcane at the time of harvest) with reasonable accuracy, and that the trend of sucrose accumulation within the same harvest season follows a second order curve.

SUMMARY OF THE INVENTION

According to one aspect of the present invention, a method is implemented by a computer for generating a product recovery prediction model for predicting recovery of a product from a crop the method comprises the following: inputting product recovery data related to the recovery of the product from the crop by date, age, and variety; generating a first model that models first dependent effects on the recovery of the product, wherein the first dependent effects comprises season dependent effects; generating a second model that models second dependent effects on the recovery of the product, wherein the second dependent effects comprises age dependent effects; generating a third model that models third dependent effects on the recovery of the product, wherein the third dependent effects comprises effects other than season dependent effects and age dependent effects; combining the first, second, and third models; and, generating the product recovery prediction model based on the combined first, second, and third models and on the product recovery data.

According to another aspect of the present invention, a computer readable storage medium has program code stored thereon such that the program code, when executed by a computer, performs the following functions: receiving date, age, and data corresponding to a crop, wherein the other data corresponds to data relating to effects on product recovery other than date and age; computing an amount of product that can be recovered from the crop assuming that the crop is harvested on day d, wherein the computing is performed based on the date, age, and other data and on a product recovery prediction model, and wherein the product recovery prediction model is based on date effects on product recovery, age effects on product recovery, and effects on product recovery other than date and age; and, providing the amount of product as an output.

According to still another aspect of the present invention, a computer readable storage medium has program code stored thereon such that the program code, when executed by a computer, performs the following functions: receiving product recovery data related to the recovery of a product from a crop, wherein the product recovery data relates to one of age, season date, and weather; and, generating a product recovery prediction model based on the receiving product recovery data, wherein the product recovery prediction model models effects dependent on one of age, season date, and weather.

BRIEF DESCRIPTION OF THE DRAWINGS

These and other features, aspects, and advantages of the present invention will become better understood when the following detailed description is read with reference to the accompanying drawings in which wherein.

DETAILED DESCRIPTION

Product prediction recovery may, for example, involve a training stage and a use stage. During the training stage, a model for product recovery system is generated, values for the parameters of the model are determined based on training data, and the values are inserted for the parameters in the model to complete the product recovery prediction model. Model generation and parameter value determination are based on equations (1)-(25) described below. During the use stage, the completed product recovery prediction model is used to predict the recovery of a product from a crop.

The product, for example, may be sugar, and the crop, for example, may be sugarcane. However, the present invention applies to products recovered from other crops also.

As an example, a sample sugar processing facility may have two harvest seasons in a year. The first season can be from December to July, while the second season can run from August to October. In this example, the first season production and the harvest data from year 1 to year 5 can be used to find the relationship between recovery, age, variety, season (as represented by Julian Date range), and weather conditions. Julian Dates are the numerical values representing the harvesting season, where August 1 has a numerical value of 1 and where July 31 has a numerical value of 365 or 366. It should be noted that selection of August 1 as Julian Date 1 is chosen to be dependent on selected regional weather conditions and can vary by country or by weather conditions.

The planting regions are classified into different zones based on weather, soil, and irrigation conditions. In the first seasons of years 1 to 5, n different varieties are processed. The difference between the planting date and the harvesting date is considered to be the sugarcane age.

Figure 1:
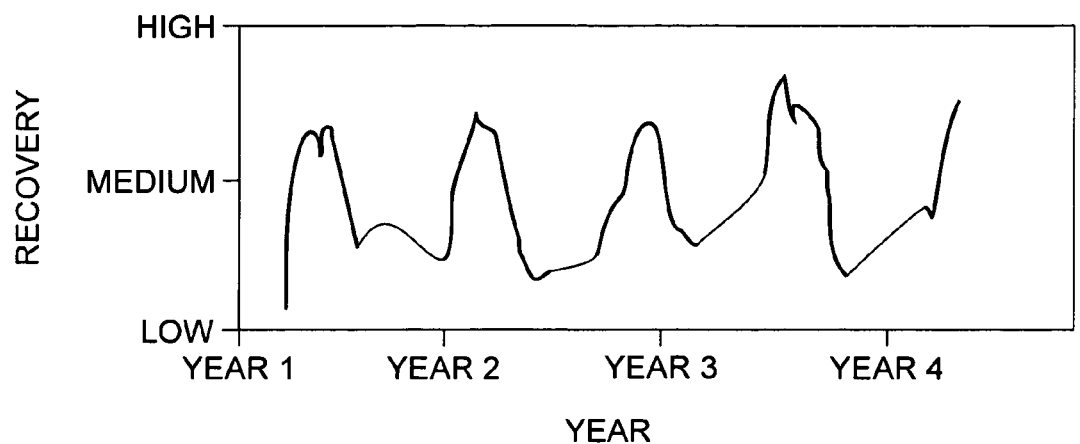
FIG. 1 illustrates overall sugar recovery variation as a function of actual date for a sample set of example data.
Figure 2:
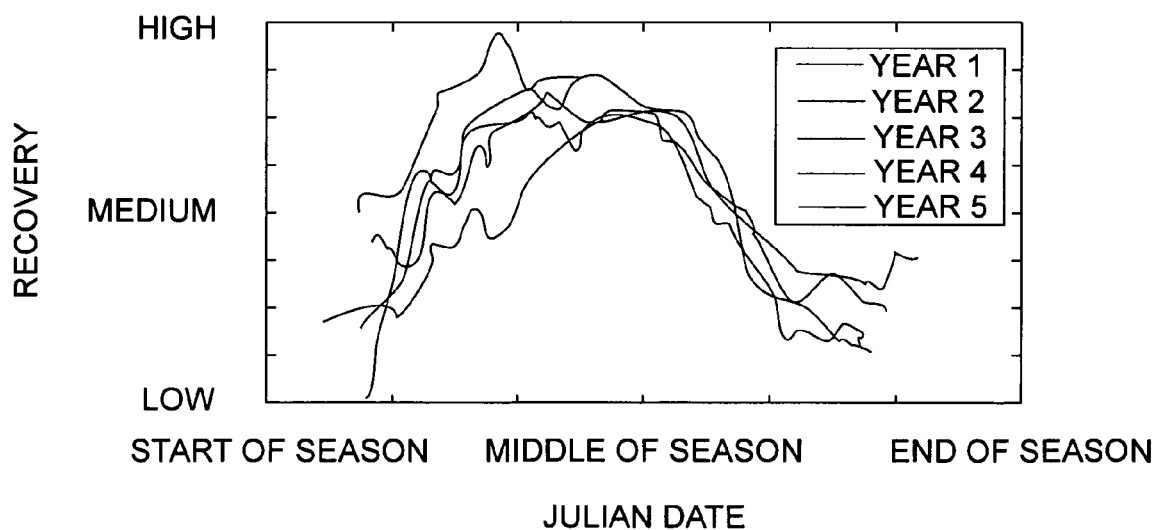
FIG. 2 illustrates overall sugar recovery variation as a function of Julian Date for the sample set of example data.

According to sample data for this example, the overall recovery variation as a function of actual date and as a function of Julian Date is shown in FIGS. 1 and 2, respectively. The recovery values shown in these figures are for loads accumulated throughout an entire day and are not for individual truck loads. From FIG. 2 it is clear that the individual daily recovery follows a second order (quadratic) path with respect to Julian Date within the harvest season. However, there are vertical ups and downs in the recovery values of different harvest seasons, mostly because of weather conditions.

The age of the sugarcane load is calculated using the planting date and the harvest date. The ages of the sugarcane loads are observed to vary in the range of 240 days to 750 days. However, most varieties are harvested when their ages are between 300 to 510 days.

Based on this information, the sugarcane loads can be classified, for example, in twenty-three different age groups. The first age group is for all those loads having an age value less than 300 days, while the last age group is for all those loads having an age value greater than 510 days. Each of the other age groups may be assigned an age range of ten days. The use of a ten day age range is based on the assumption that the sucrose accumulation within sugarcane within a ten day time period does not vary significantly and, hence, can be safely considered as constant. However, as desired, a number of age groups other than twenty three may be used, the age ranges may have increments other than ten, and uniform age ranges need not be used.

Sugar recovery is a function of various factors or effects such as variety (cultivar), age of sugarcane loads, season represented by Julian Date ranges, and such other effects as weather conditions, including rainfall, maximum temperature, temperature difference between maximum and minimum temperatures, and humidity such as relative humidity. FIG. 2 indicates that sugar recovery follows a quadratic path with respect to seasonal effects (indicated by Julian Date), and it will also follows a quadratic path with respect to age (e.g., maturity). Moreover, individual sugarcane varieties (or cultivars) follow distinct sucrose maturation curves. Modeling all these effects in a single model in one step makes it difficult to determine the contributions or exact relationships between recovery and the individual factors. Therefore, a sequential approach is followed in order to develop a mathematical formulation for the estimation of sugar recovery.

Figure 3:
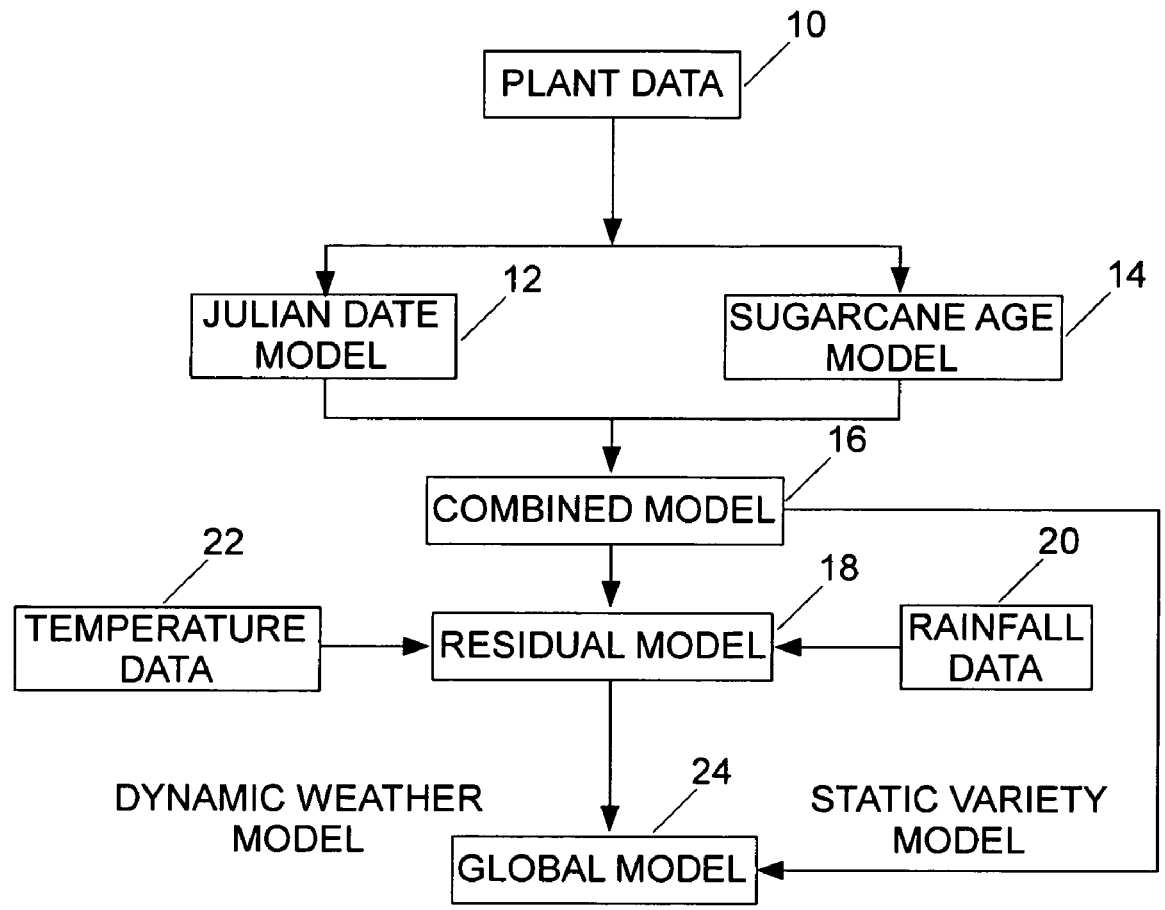
FIG. 3 is a flow chart representing an example of a program that can be executed for generating a sugar recovery prediction model.

This sequential modeling approach is illustrated in FIG. 3, which starts with inputting planting data at a block 10. This planting data includes data on sugar recovery by variety, by age, by seasonal date (e.g., Julian Date) and also data on other effects such as caused by weather, soil, and/or irrigation conditions. The weather effects, for example, may include the effects of rainfall, maximum temperature, difference between maximum and minimum temperature, and/or relative humidity by actual date.

As is shown in FIG. 3, a season dependent model is generated at a block 12 independently of an age effect model generated at a block 14 and also independently of other conditions (such as weather conditions) which are modeled as discussed below. For convenience, the season dependent model 12 is sometimes referred to herein as the Julian Date effect model and is based on the dates within the growing season.

The dominant different varieties (the plant cane and ratoon of the same sugarcane variety are treated as different varieties) are considered during generation of the Julian Date effect model at the block 12 and of the age effect model at the block 14. The independent models generated at the blocks 12 and 14 for the Julian Date and age effects are then integrated at a block 16 to produce a combined model that considers variety, Julian Date, and age effects while predicting (or estimating) sugar recovery.

A prediction error model is generated at a block 18 from the combined model produced at the block 16 and can be attributed to other conditions such as conditions related to weather changes, soil, and/or irrigation. This prediction error model is generated at the block 18. Rainfall data is input at a block 20, and temperature data is input at a block 22. The temperature data includes data on the maximum temperature and on the difference between maximum and minimum temperature by actual date.

The dynamic weather model so obtained is then integrated with the combined (static variety) model at a block 24 to produce a global model that can then be used for predicting sugar recovery.

These various models are generated in accordance with the equations discussed below. The recovery vs. Julian Date plot of FIG. 2 is parabolic in nature, which strongly suggests a quadratic relationship between recovery and Julian Date. Thus, a reasonable assumption is that even individual variety recovery values will also follow a second order path with respect to Julian Date. The combined effect of individual variety recovery paths yields the day-wise recovery $\hat{r}_{d,v}^{JD}$ as a function of Julian Date, which can be expressed by the following equation:

$$\hat{r}_{d,v}^{JD} = (a_v)(JD_d^2) + (b_v)(JD_d) \quad \forall d, \forall v \tag{1}$$

where d represents harvesting day, v represents variety, $JD_d$ is a variable representing Julian Date for harvesting day d, $a_v$ represents a parameter for variety v so as to model the Julian Date effect on sugar recovery, and $b_v$ represents another parameter for variety v so as to model the Julian Date effect on sugar recovery. The harvesting date d is the actual date rather than as Julian Date. Accordingly, equation (1) is the Julian Date model.

Although the effects of Julian Date is assumed to be a second order relationship, the effects of Julian Date can be modeled by using a relationship other than a quadratic relationship. For example, a linear relationship or other non-linear relationship may be used.

The $a_v$ and $b_v$ in equation (1) are determined by plugging the actual data entered at 10 of FIG. 3 into equation (1) and computing values for the parameters $a_v$ and $b_v$. In other words, equation (1) is made to fit this data.

If desired, ranges can be assigned to the individual variety parameters $a_v$ and $b_v$. If so, the values that are determined for the parameters $a_v$ and $b_v$ can be constrained to fall within these ranges.

To find a relationship between age and recovery, the entire sample set of example harvest data used herein was scanned to find a date range in which only a few varieties were used dominantly and in which there was no rainfall or only mild rainfall just before and during the corresponding date range. When a quadratic relationship is assumed, the recovery values that can be predicted using only age information were significantly close to the actual values.

Assuming, a second order relationship between age and recovery, the following equation can be used as a basis for the age dependent model:

$$\hat{r}_{d,v,a}^{A} = (c_v)(\overline{A}_{d,v,a}^2) + (d_v)(\overline{A}_{d,v,a}) \tag{2}$$

where $\hat{r}_{d,v,a}^{A}$ represents the day/variety/age group wise recovery of sugar as a function of age, $\overline{A}_{d,v,a}$ is a variable representing the weighted average age of the load belonging to age group a for variety v on harvesting day d, and $c_v$ and $d_v$ are parameters for variety v so as to model the age effect on sugar recovery. As in the case of equation (1), the harvesting date d is the actual date rather than as Julian Date. Accordingly, equation (2) is the sugarcane age model.

Although the effects of age is assumed to be a second order relationship, the effects of age can be modeled by using a relationship other than a quadratic relationship. For example, a linear relationship or other non-linear relationship may be used.

The parameters $c_v$ and $d_v$ in equation (2) are determined by plugging the actual data entered at 10 of FIG. 3 into equation (2) and computing values for the parameters $c_v$ and $d_v$. In other words, equation (2) is made to fit this data.

If desired, ranges can be assigned to the individual variety parameters $c_v$ and $d_v$. If so, the values that are determined for the parameters $c_v$ and $d_v$ can be constrained to fall within these ranges.

The combined model to address both Julian Date and age effects can be given according to the following equation:

$$\hat{r}_{d,v,a} = \hat{r}_{d,v}^{JD} + \hat{r}_{d,v,a}^{A} - e_v \quad \forall d, \forall v, \forall a \tag{3}$$

In Equation (3), a bias term $e_v$ has been added for each variety v. By substituting equations (1) and (2) into equation (3), equation (3) can be rewritten according to the following equation:

$$\hat{r}_{d,v,a} = (a_v)(JD_d^2) + (b_v)(JD_d) + (c_v)(\overline{A}_{d,v,a}^2) + (d_v)(\overline{A}_{d,v,a}) - e_v \quad \forall d, \forall v, \forall a \tag{4}$$

Equation (4) can be used to determine a predicted sugar recovery for a harvesting day d, for a sugarcane variety v, and for an age group a. The predicted recovery value for a harvesting day d for all varieties and age groups can be obtained using weight fractions and is given by the following equation:

$$\hat{r}_d = \sum_{v=1}^{N_V} \sum_{a=1}^{N_a} (W_{d,v,a})(\hat{r}_{d,v,a}) \quad \forall d \tag{5}$$

where $N_v$ is the set of sugarcane varieties, $N_a$ is the set of age groups, and $W_{d,v,a}$ is a weight fraction for a load of age group a and variety v on harvesting day d.

The weight fractions $W_{d,v,a}$ are determined by dividing the weight of a load for a given harvesting day d, variety v, and age group a by the sum of weights of all loads for varieties v, and age groups a on harvesting day d.

The combined model represented by equations (4) and (5) can be fitted to the sample production and harvest data of an industry in order to estimate the parameters $a_v$, $b_v$, $c_v$, $d_v$, and $e_v$. The estimation of these parameters is solved as an optimization problem according to the following objective function:

$$\min_{a_v, b_v, c_v, d_v, e_v} \sum_{d=1}^{N_d} \varepsilon_d^{abs} \tag{6}$$

where $N_d$ is the set of harvesting days and $\varepsilon_d^{abs}$ represents the absolute error, which is calculated in accordance with the following equations:

$$\varepsilon_d^{abs} \geq R_d - \hat{r}_d \quad \forall d \tag{7}$$

$$\varepsilon_d^{abs} \geq -(R_d - \hat{r}_d) \quad \forall d \tag{8}$$

where $R_d$ is the actual sugar recovery in percent on harvesting day d. The quantity $\varepsilon_d^{abs}$ always stores the positive difference between $R_d$ and $\hat{r}_d$. However, to use linear programming (LP)

relaxation of the constraints given by Equations (7) and (8), the following constraint is included into the optimization problem:

$$\epsilon_d^{abs} \leq R_d \forall d \qquad (9)$$

Also, a few additional LP tightening constraints can be applied, if desired, as follows and can be obtained using the domain knowledge about the relationship between age and recovery:

$$R_d - 2.0 \leq \hat{r}_{d,v,a} \leq R_d + 0.75 \ \forall d, \forall v, \forall (a=1,\ldots,5, 16,\ldots,23) \qquad (10)$$

$$R_d - 0.75 \leq \hat{r}_{d,v,a} \leq R_d + 2.0 \ \forall d, \forall v, \forall (a=6,\ldots,15) \qquad (11)$$

The constraints given by Equations (9) to (11) are optional constraints to make the optimization search space more compact. The upper and lower bounds on the parameters obtained while modeling the Julian Date and age effects separately can also be included in the optimization problem.

As in the case of the parameters $a_v$, $b_v$, $c_v$, and $d_v$, ranges can be assigned, if desired, to the parameter $e_v$. If so, the value that is determined for the parameters $e_v$ can be constrained to fall within these ranges.

The range constraints that are placed on the parameters $a_v$, $b_v$, $c_v$, $d_v$, and $e_v$, are very specific to the sample data and need to pre-estimated for other harvest data, as sugarcane is a weather sensitive crop. The linear optimization problem with the objective function given by Equation (6) and subject to the constraints as given above is solved to estimate the optimal parameter values for parameters $a_v$, $b_v$, $c_v$, $d_v$, and $e_v$. Alternatively, since the main aim of the objective function given by Equation (6) is error minimization, this objective function could instead be a non-linear objective function.

Figure 4:
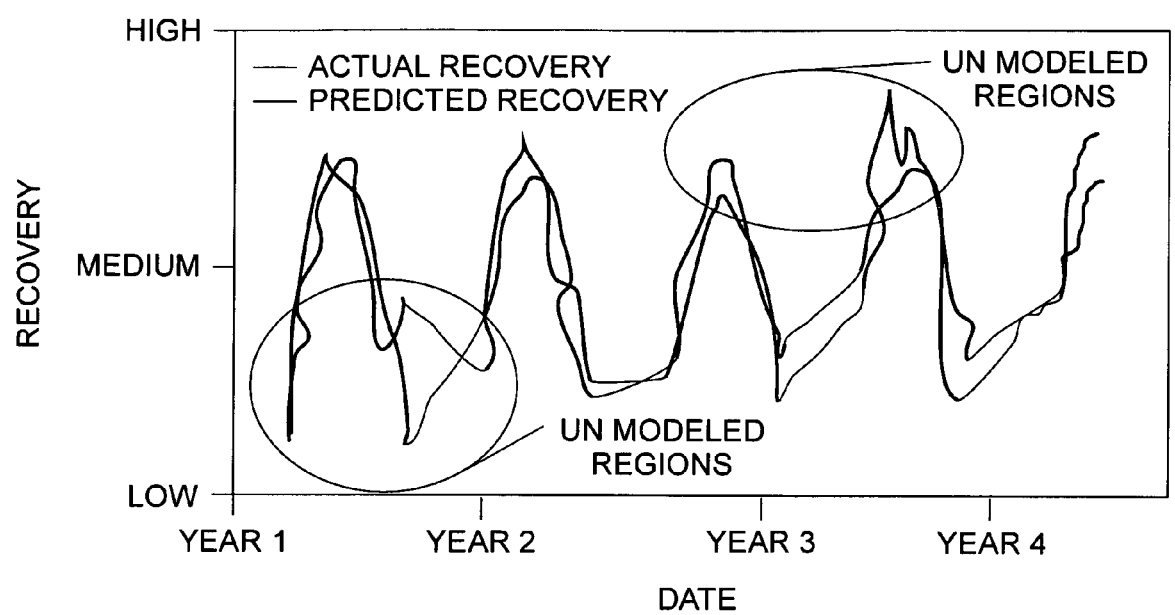
FIG. 4 illustrates plots for actual and predicted recoveries of sugar based on the sample set of example data.

The actual and the predicted recoveries based on the sample set of example data are plotted in FIG. 4. From FIG. 4, it is clear that there is much ground left un-modeled even after combining the season (Julian Date) and age models. The residual vector (the un-modeled portion of the sugar recovery) is calculated using following equation:

$$f_d = R_d - \hat{r}_d \ \forall d \qquad (12)$$

where $f_d$ is the residual error on harvesting day d, $R_d$ is the actual recovery on harvesting day d, and $\hat{r}_d$ is the estimated or predicted recovery on harvesting day d. The residual error $f_d$ is mainly caused by ignoring conditions other than Julian Date and age. Such other conditions may include, for example, weather and/or irrigation and/or soil conditions.

The residual error $f_d$ of equation (12), which is obtained after modeling the Julian Date and age effects, is an indication, for example, of unmodeled weather effects. For example, the residual error using weather information such as rainfall, maximum temperature, and the difference between maximum and minimum temperatures (i.e., delta temperature) can be modeled as discussed below. The residual error can be predicted using weather information as given by the following equation:

$$\hat{f}_d = \hat{f}_d^{RF} + \hat{f}_d^{MT} + \hat{f}_d^{\Delta T} \ \forall d \qquad (13)$$

where $\hat{f}_d^{RF}$ is the residual rain fall model that considers the effect of rainfall for the last n months rain fall (e.g., n=8), $\hat{f}_d^{MT}$ is the residual maximum temperature model that considers the effect of the maximum temperature for the last r months (e.g., r=6), and $\hat{f}_d^{\Delta T}$ is the residual delta temperature model that considers the effect of the difference between the maximum and minimum temperature for the last r months.

The residual rainfall model is dynamic in nature and includes three terms as given by the following equation:

$$\hat{f}_d^{RF} = \hat{f}_d^{RF1} + \hat{f}_d^{RF10} + \hat{f}_d^{RF30} \ \forall d \qquad (14)$$

The first term $\hat{f}_d^{RF1}$ captures the rainfall effect for the last ten days as given in the following equation:

$$\hat{f}_d^{RF1} = \left(\sum_{i=1}^{10} rf_i\right)\left(\sum_{z=1}^{N_z}(WZ_{d,z})(RF_{d-i,z})\right) \forall d \qquad (15)$$

where i represents a rainfall summation index, $rf_i$ is a parameter useful in modeling the rainfall effect on the recovery of sugar, z is a summation index representing zone or area, $N_z$ is the set of all zones, $WZ_{d,z}$ represents a weight fraction for a sugarcane load from zone z on harvesting day d, and $RF_{d,z}$ is a variable representing the rainfall in zone z on harvesting day d. There are ten rainfall parameters $rf_1, \ldots, rf_{10}$ in Equation (15), which will be determined while predicting the effect of last ten days rainfall on recovery. This term helps in analyzing the effect of the last ten days rainfall on recovery. (These ten days are the ten days just prior to harvesting day d.) A time period other than ten days can instead be used in connection with equation (15).

The second term $\hat{f}_d^{RF10}$ in Equation (14) captures the effect of rainfall in the period of the last eleven to sixty days in ten day slots. Hence, there are five distinct slots. Therefore, this second term may be given by the following equation:

$$\hat{f}_d^{RF10} = \left(\sum_{i=1}^{5} rf_{i+10}\right)\left(\sum_{z=1}^{N_z}(WZ_{d,z})\left(\sum_{m=1}^{30} RF_{d-10i-m,z}\right)\right) \forall d \qquad (16)$$

where m is a summation index. Hence, using Equations (15) and (16), the rainfall effect for the last sixty days (2 months) is considered. There are five rainfall parameters $rf_{11}, \ldots, rf_{15}$ in Equation (16). A time period other than eleven to sixty days and slots other than ten day slots can instead be used in connection with equation (16).

The rainfall effect for the remaining six months is captured in monthly slots (slots of 30 days) in the last term of Equation (14) as given by the following equation:

$$\hat{f}_d^{RF30} = \left(\sum_{i=1}^{6} rf_{i+15}\right)\left(\sum_{z=1}^{N_z}(WZ_{d,z})\left(\sum_{m=1}^{30} RF_{d-30i-m-30,z}\right)\right) \forall d \qquad (17)$$

There are six rainfall parameters $rf_{16}, \ldots, rf_{21}$ in Equation (17). Hence, in total, there are twenty-one parameters in this dynamic residual rainfall model to predict effect of rainfall on the recovery of sugar from sugarcane. A number of months other than six and slots other than thirty day slots can instead be used in connection with equation (17).

The residual model for predicting the effect of maximum temperature on sugar recovery is also considered dynamic in nature and contains two terms as given by the following equation:

$$\hat{f}_d^{MT} = \hat{f}_d^{MT10} + \hat{f}_d^{MT30} \ \forall d \qquad (18)$$

The first term $\hat{f}_d^{MT10}$ considers the maximum temperature effect for the last two months in ten day slots, while the second term $\hat{f}_d^{MT30}$ considers the maximum temperature effect for the remaining four months (out of the last six months) in thirty day slots. Hence, these two terms are given by the following equations:

$$\hat{f}_d^{MT10} = \left(\sum_{j=1}^{6} mt_j\right)\left(\sum_{z=1}^{N_z}(WZ_{d,z})\left(\sum_{m=1}^{10} MT_{d-10j-m+10,z}\right)\right) \forall\, d \quad (19)$$

$$\hat{f}_d^{MT30} = \left(\sum_{j=1}^{4} mt_{j+6}\right)\left(\sum_{z=1}^{N_z}(WZ_{d,z})\left(\sum_{m=1}^{30} MT_{d-30j-m-30,z}\right)\right) \forall\, d \quad (20)$$

where j represents a maximum temperature summation index, $mt_j$ is a maximum temperature parameter useful in modeling the maximum temperature effect on sugar recovery, and $MT_{d,z}$ is a variable for the maximum temperature in zone z on harvesting day d. Hence, there are in total ten parameters $mt_1, \ldots, mt_{10}$ in the dynamic residual model that captures the effect of maximum temperature on sugar recovery prediction. A time period other than the last two months and slots other than ten day slots can instead be used in connection with equation (19), and a time period other than the remaining four months (out of the last six months) and slots other than thirty day slots can instead be used in connection with equation (20).

The dynamic delta temperature model that models the effect of the difference between maximum and minimum temperatures on sugar recovery is very similar to the maximum temperature model and is given by the following equation:

$$f_d^{\Delta T} = f_d^{\Delta T10} + f_d^{\Delta T30} \,\forall\, d \quad (21)$$

The first term $\hat{f}_d^{\Delta T10}$ considers the delta temperature effect for the last two months in ten day slots, while the second term $\hat{f}_d^{\Delta T30}$ considers the delta temperature effect for the remaining four months (out of the last six months) in thirty day slots. Hence, these two terms are given by the following equations:

$$\hat{f}_d^{\Delta T10} = \left(\sum_{k=1}^{6} \delta t_k\right)\left(\sum_{z=1}^{N_z}(WZ_{d,z})\left(\sum_{m=1}^{10} \Delta T_{d-10k-m+10,z}\right)\right) \forall\, d \quad (22)$$

$$\hat{f}_d^{\Delta T30} = \left(\sum_{k=1}^{4} \delta t_{k+6}\right)\left(\sum_{z=1}^{N_z}(WZ_{d,z})\left(\sum_{m=1}^{30} \Delta T_{d-30k-m-30,z}\right)\right) \forall\, d \quad (23)$$

where k represents a delta temperature summation index, where $\delta t_k$ is a delta temperature parameter useful in modeling the delta temperature effect on sugar recovery, and $\Delta T_{d,z}$ is the delta temperature variable for zone z on harvesting day d. Hence, in the dynamic residual model that captures the effect of delta temperature on sugar recovery, there are ten parameters $\delta t_1, \ldots, \delta t_{10}$ which will be determined during recovery prediction using linear programming optimization techniques operating on the sample set of example data. A time period other than the last two months and slots other than ten day slots can instead be used in connection with equation (22), and a time period other than the remaining four months (out of the last six months) and slots other than thirty day slots can instead be used in connection with equation (23).

The combined dynamic residual model that predicts the effect of weather conditions on sugar recovery comprises, for example, a total forty-one parameters (twenty-one for rainfall and ten each for maximum temperature and delta temperature). These parameters may be determined by plugging the actual data entered at 10 of FIG. 3 into the appropriate equations and computing values for the corresponding parameters. In other words, these equations are made to fit this data. It should be noted that other weather effects such as relative humidity, wind direction and speed, etc. can also be included in dynamic weather model. Also, the total number of 41 parameters used for the weather model are based on the structure of the current representative model and other numbers of parameters can be used.

Figure 5:
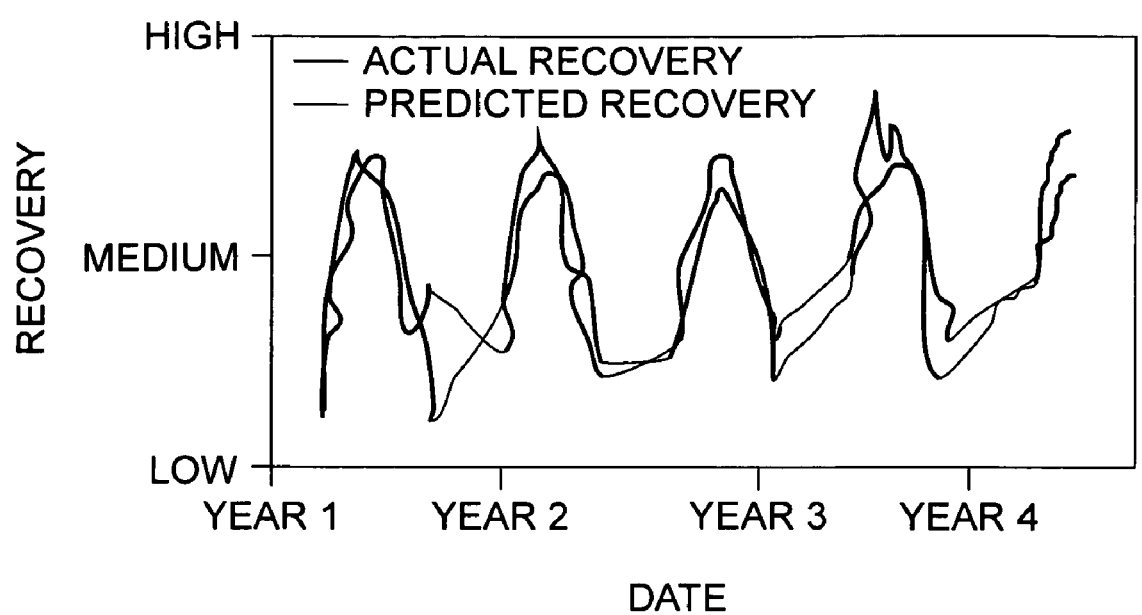
FIG. 5 shows actual and predicted recoveries dependent upon season, variety, age, and weather effects.

The results obtained after using the global model for parameter estimation and recovery predictions are encouraging. The plot of actual recovery versus predicted recovery is shown in FIG. 5. It is clear from this figure that the global model, which considers season (Julian Date), variety, age, and weather effects simultaneously, successfully predicts the overall recovery variation. Even though the overall recovery predictions are as per expectation, it is more important to note how sucrose concentrations of individual varieties vary with the expectation.

The last step in the modeling of sugar recovery prediction is to combine the "Static Variety Model" (which considers Julian Date and age effects) and the "Dynamic Weather Model" (which is function of rainfall, maximum temperature, and the difference between maximum and minimum temperatures) by modifying Equation (5) to include the effects of weather as given by the following equation:

$$\hat{r}_d = \sum_{v=1}^{N_v}\sum_{a=1}^{N_a}(W_{d,v,a})(\hat{r}_{d,v,a}) + \hat{f}_d \;\forall\, d \quad (24)$$

and by modifying the optimization objective function given by Equation (6) as given by the following equation:

$$\min_{a_v,b_v,c_v,d_v,e_v,rf_i,mt_j,\delta t_k} \sum_{d=1}^{N_d} \varepsilon_d^{abs} \quad (25)$$

The set of constraints given by Equations (4), (5), and (7)-(11) still apply.

As discussed above, this modeling approach described above may be implemented in accordance with the flow chart of FIG. 3, which starts with inputting planting data at the block 10. This planting data includes data on sugar recovery, by variety, by age, by Julian Date and data on rainfall, maximum temperature, and the difference between maximum and minimum temperature by date. The Julian Date effect model is generated in accordance with equation (1) at the block 12, and the age effect model is generated in accordance with equation (2) at a block 14. The Julian Date effect model is generated independently of the age effect model and also independently of weather information.

The independent models generated at the blocks 12 and 14 for the Julian Date and age effects are then integrated at a block 16 in accordance with equations (3)-(5) to produce a combined model that considers variety, Julian Date, and age effects while predicting (estimating) sugar recovery.

The prediction error model is generated at the block 18 in accordance with equations (12)-(23), the rainfall data is input at the block 20, and the temperature data is input at the block 22.

The dynamic weather model so obtained is then integrated with the combined (static variety) model at a block 24 in accordance with equation (24) to produce a final global model for sugar recovery prediction. Also at the block 24, the parameters $a_v$, $b_v$, $c_v$, $d_v$, $e_v$, $rf_i$, $mt_j$, and $\delta t_k$ of equation (24) are determined in accordance with equation (25), in accordance with the constraints given by equations (7)-(23), in accordance with the sample planting data input at the block 10, in accordance with the sample rainfall data input at the block 20, and in accordance with the sample temperature data input at the block 22.

Figure 7:
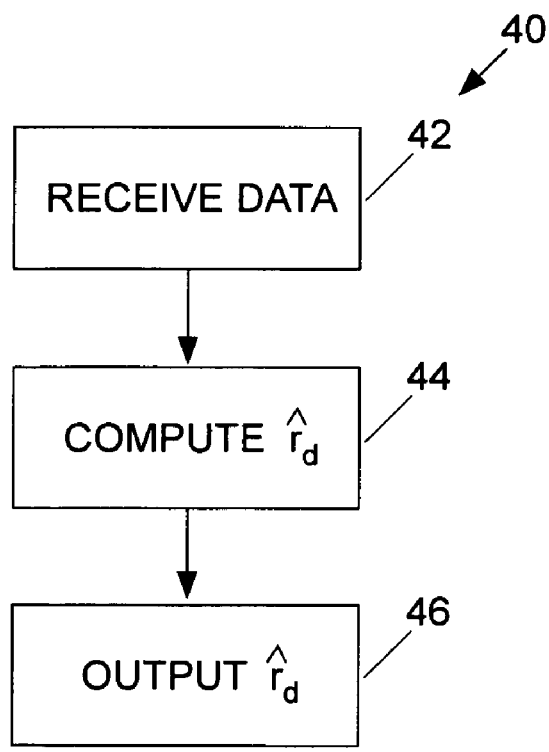

These parameters can then be inserted into the global model of equation (24) for use in predicting sugar recovery from future sugarcane crops as shown in FIG. 7.

Figure 6:
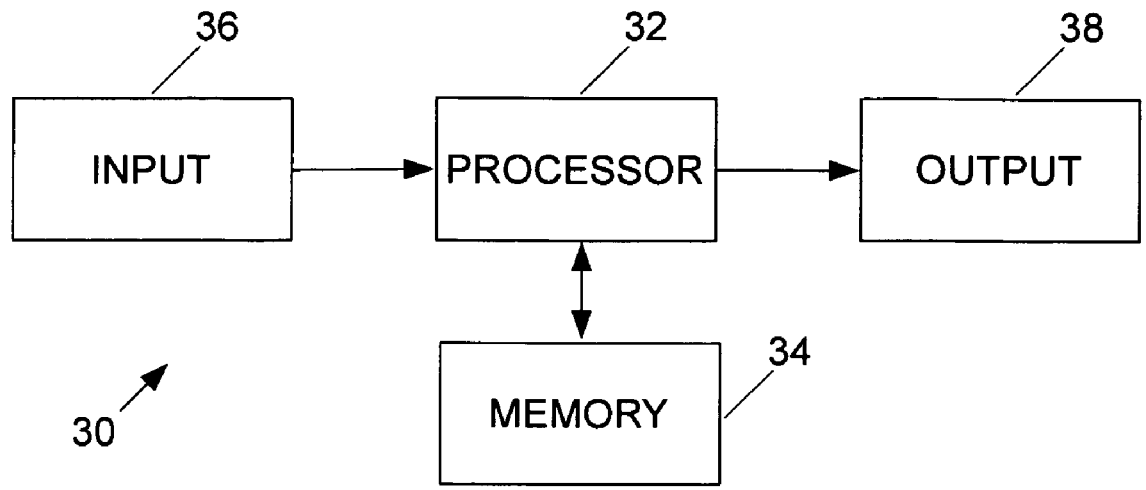
FIG. 6 illustrates a computer as an example mechanism for the implementation of the present invention; and, FIG. 7 is a flow chart representing a program that can be executed by a computer for predicting sugar recovery from sugarcane crops.

The program corresponding to the flow chart of FIG. 3 can be executed in connection with a computer 30 shown in FIG. 6. The computer 30 includes a processor 32, a memory 34, an input device(s) 36, and an output device(s) 38. The planting data, the rainfall data, and the temperature data are input to the computer 30 by the input device 36 and are stored in the memory 34 along with the various models that are used in generating the global model for sugar recovery prediction. The program corresponding to the flow chart of FIG. 3 is also stored in the memory 34 and is executed by the processor 32 in order to generate the global model sugar recovery prediction.

FIG. 7 is a flow chart representing a program 40 that can be executed by a computer, such as the computer 30, for predicting sugar recovery from sugarcane crops during the use stage. At a block 42, the program 40 receives the planting and weather data corresponding to the variables $JD_d$, $\overline{A}_{d,v,a}$, $RF_{d,z}$, $MT_{d,z}$, and $\Delta T_{d,z}$ of the global model. At a block 44, the program 40 computes the sugar recovery $\hat{r}_d$ for a harvesting day d in accordance with the global model generated by the program of FIG. 3 based on sample planting and weather data. At a block 46, the program 40 outputs the sugar recovery $\hat{r}_d$ for use by a user who determines whether this sugar recovery is sufficient to trigger harvesting.

Certain modifications of the present invention have been discussed above. Other modifications of the present invention will occur to those practicing in the art of the present invention. For example, the present invention has been described above in connection with sugarcane crops. However, the present invention could be used in connection with other crops.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method implemented by a computer for generating a product recovery prediction model for predicting recovery of a product from a crop, the method comprising:
   inputting product recovery data related to the recovery of the product from the crop by date, age, and variety;
   generating a first model that models first dependent effects on the recovery of the product, wherein the first dependent effects comprises season dependent effects;
   generating a second model that models second dependent effects on the recovery of the product, wherein the second dependent effects comprises age dependent effects;
   generating a third model that models third dependent effects on the recovery of the product, wherein the third dependent effects comprises effects other than season dependent effects and age dependent effects, wherein the first model is exclusive of the second and third dependent effects, wherein the second model is exclusive of the first and third dependent effects, and wherein the third model is exclusive of the first and second dependent effects;
   combining the first, second, and third models; and,
   generating the product recovery prediction model based on the combined first, second, and third models and on the product recovery data.

2. The method of claim 1 wherein the first model comprises is a first linear model, and wherein the second model comprises is a second linear model.

3. The method of claim 1 wherein the first model comprises is a first non-linear model, and wherein the second model comprises is a second non-linear model.

4. The method of claim 3 wherein the first non-linear model comprises a first quadratic model, and wherein the second non-linear model comprises a second quadratic model.

5. The method of claim 1 wherein the first model comprises date related parameters and date related variables, wherein the second model comprises age related parameters and age related variables, wherein the third model comprises weather related parameters and weather related variables, and wherein the generating of the product recovery prediction model comprises:
   determining values for the date related parameters, the age related parameters, and the weather related parameters in accordance with the product recovery data; and,
   inserting the values into the product recovery prediction model in place of the corresponding parameters.

6. The method of claim 5 wherein the determining of values for the date related parameters, the age related parameters, and the weather related parameters comprises computing the values that minimize an objective function, and wherein the objective function is a function of a difference between actual product recovery and predicted product recovery.

7. The method of claim 1 wherein the generating of a third model comprises generating a third model that models effects of rainfall, maximum temperature, and a difference between maximum and minimum temperatures on product recovery.

8. The method of claim 7 wherein the first model comprises date related parameters and date related variables, wherein the second model comprises age related parameters and age related variables, wherein the third model comprises weather related parameters and weather related variables, and wherein the generating of the product recovery prediction model comprises:
   determining values for the date related parameters, the age related parameters, and the weather related parameters in accordance with the product recovery data; and,
   inserting the values into the product recovery prediction model in place of the corresponding parameters.

9. The method of claim 8 wherein the determining of values for the date related parameters, the age related parameters, and the weather related parameters comprises computing the values that minimize an objective function, and wherein the objective function is a function of a difference between actual product recovery and predicted product recovery.

10. The method of claim 1 wherein the crop comprises sugarcane, and wherein the product comprises sugar.

11. The method of claim 1 wherein the season dependent effects comprise date dependent effects.

12. The method of claim 11 wherein the date dependent effects comprise Julian date dependent effects.

13. The method of claim 1 wherein the third dependent effects comprise weather dependent effects.

14. The method of claim 1 wherein the third dependent effects comprise soil dependent effects.

15. The method of claim 1 wherein the third dependent effects comprise irrigation dependent effects.

16. The method of claim 1 wherein the generating of a third model comprises generating a third model that models effects of humidity on product recovery.

17. A computer readable storage medium having program code stored thereon such that the program code, when executed by a computer, performs the following functions:
receiving date, age, and residual error data corresponding to a crop, wherein the age data comprises data based on an age of crop from planting to harvesting;
computing an amount of product that can be recovered from the crop assuming that the crop is harvested on day d, wherein the computing is performed based on the date, age, and residual error data and on a product recovery prediction model, wherein the residual error related data comprises residual data based on a residual error between actual product recovery and a product recovery that is predicted based only on date and age, and wherein the product recovery prediction model is based on date effects on product recovery, age effects on product recovery, and effects on product recovery other than date and age; and,
providing the amount of product as an output.

18. The computer readable storage medium of claim 17 wherein the product recovery prediction model comprises a quadratic date related portion.

19. The computer readable storage medium of claim 17 wherein the product recovery prediction model comprises a quadratic age related portion.

20. The computer readable storage medium of claim 17 wherein the product recovery prediction model comprises a linear date related portion and a linear age related portion.

21. The computer readable storage medium of claim 17 wherein the product recovery prediction model comprises a non-linear date related portion and a non-linear age related portion.

22. The computer readable storage medium of claim 21 wherein the non-linear date related portion comprises a quadratic date related portion, and wherein the non-linear age related portion comprises a quadratic age related portion.

23. The computer readable storage medium of claim 17 wherein the product recovery prediction model comprises date related parameters and date related variables, age related parameters and age related variables, and weather related parameters and weather related variables, and wherein the date related parameters, the age related parameters, and the weather related parameters have values chosen to fit the product recovery prediction model to sample data.

24. The computer readable storage medium of claim 23 wherein the values are chosen so as to minimize an objective function, and wherein the objective function is a function of a difference between actual product recovery and predicted product recovery.

25. The computer readable storage medium of claim 17 wherein the weather data comprises rainfall data, maximum temperature data, and data relating to a difference between maximum and minimum temperatures.

26. The computer readable storage medium of claim 17 wherein the date comprises Julian Date.

27. The computer readable storage medium of claim 17 wherein the crop comprises sugarcane, and wherein the product comprises sugar.

28. The computer readable storage medium of claim 17 wherein the weather data include humidity data.

29. A computer readable storage medium having program code stored thereon such that the program code, when executed by a computer, performs the following functions:
receiving product recovery data related to the recovery of a product from a crop, wherein the product recovery data relates to age, season date, and residual error; and,
generating a product recovery prediction model based on the receiving product recovery data, wherein the product recovery prediction model models effects dependent on age, season date, and residual error, wherein the residual error related data comprises residual data based on a residual error between actual product recovery and product recovery predicted from a product recovery prediction model based only on season date and age.

30. The computer readable storage medium of claim 29 wherein the residual error related data includes data based on rainfall, maximum temperature, and a difference between maximum and minimum temperatures.

31. The computer readable storage medium of claim 29 wherein the residual error related data includes data based on humidity.

32. The computer readable storage medium of claim 31 wherein the residual error related data includes data based on rainfall, maximum temperature, and a difference between maximum and minimum temperatures.

33. The computer readable storage medium of claim 29 wherein the product recovery prediction model comprises a linear product recovery prediction model.

34. The computer readable storage medium of claim 29 wherein the product recovery prediction model comprises a non-linear product recovery prediction model.

35. The computer readable storage medium of claim 34 wherein the non-linear product recovery prediction model comprises a quadratic product recovery prediction model.

36. The computer readable storage medium of claim 29 wherein the product recovery prediction model comprises parameters and variables, and wherein the function of generating of the product recovery prediction model comprises the further functions of:
determining values for the parameters in accordance with the product recovery data; and,
inserting the values into the product recovery prediction model in place of the corresponding parameters.

37. The computer readable storage medium of claim 36 wherein the function of determining values for the parameters comprises the function of computing the values that minimize an objective function, and wherein the objective function is a function of a difference between actual product recovery and predicted product recovery.

38. The computer readable storage medium of claim 29 wherein the crop comprises sugarcane, and wherein the crop related product comprises sugar.

39. The computer readable storage medium of claim 29 wherein the generating of a product recovery prediction model comprises generating models for age, season date, and weather dependent effects.

40. The computer readable storage medium of claim 17 wherein the other data comprises residual data based on a residual error between actual product recovery and product recovery predicted from a product recovery prediction model based only on date effects on product recovery and age effects on product recovery.

41. The computer readable storage medium of claim 40 wherein the other data includes weather related data.

* * * * *